(12) United States Patent
Sakai et al.

(10) Patent No.: US 9,291,099 B2
(45) Date of Patent: Mar. 22, 2016

(54) STRUCTURE FOR EXTRACTING COMPRESSED AIR FROM COMPRESSOR OF GAS TURBINE ENGINE AND GAS TURBINE ENGINE WITH THE STRUCTURE

(75) Inventors: Yusuke Sakai, Kobe (JP); Takuya Ikeguchi, Kobe (JP); Koji Terauchi, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 735 days.

(21) Appl. No.: 13/696,781

(22) PCT Filed: May 6, 2011

(86) PCT No.: PCT/JP2011/060599
§ 371 (c)(1),
(2), (4) Date: Nov. 7, 2012

(87) PCT Pub. No.: WO2011/142298
PCT Pub. Date: Nov. 17, 2011

(65) Prior Publication Data
US 2013/0047575 A1 Feb. 28, 2013

(30) Foreign Application Priority Data
May 10, 2010 (JP) ................................. 2010-108494

(51) Int. Cl.
| | |
|---|---|
| F02C 6/08 | (2006.01) |
| F04D 27/02 | (2006.01) |
| F02C 9/18 | (2006.01) |
| F04D 29/52 | (2006.01) |

(52) U.S. Cl.
CPC ... F02C 6/08 (2013.01); F02C 9/18 (2013.01); F04D 27/0207 (2013.01); F04D 27/0215 (2013.01); F04D 29/522 (2013.01)

(58) Field of Classification Search
CPC .......... F02C 6/08; F02C 9/18; F04D 27/0207; F04D 27/0215
See application file for complete search history.

(56) References Cited

U.S. PATENT DOCUMENTS

| | | | | |
|---|---|---|---|---|
| 3,597,106 | A | * | 8/1971 | Anderson ........... F04D 27/0215 415/144 |
| 4,329,114 | A | * | 5/1982 | Johnston ................. F01D 11/24 415/116 |
| 5,203,162 | A | * | 4/1993 | Burge ....................... F02C 6/08 60/39.091 |
| 5,351,478 | A | | 10/1994 | Walker et al. |
| 6,325,595 | B1 | | 12/2001 | Breeze-Stringfellow et al. |
| 2003/0051482 | A1 | * | 3/2003 | Charon ..................... F02C 6/08 60/785 |

FOREIGN PATENT DOCUMENTS

| | | |
|---|---|---|
| JP | 06-010709 A | 1/1994 |
| JP | 2001-304194 A | 10/2001 |

OTHER PUBLICATIONS

International Search Report; PCT/JP2011/060599; Jun. 14, 2011.

* cited by examiner

*Primary Examiner* — Gerald L Sung
*Assistant Examiner* — Scott Walthour
(74) *Attorney, Agent, or Firm* — Studebaker & Brackett PC (57) ABSTRACT

Provided is a structure of a gas turbine engine for extracting a part of compressed air generated by a compressor. The structure comprises a cylindrical housing having an annular portion extending around the compressing chamber to define an annular chamber, an annular partition dividing the annular chamber into first and second plenum chambers. The cylindrical housing has first apertures to communicate between the compressing chamber and the first plenum chamber. The partition has second apertures to communicate between the first and second plenum chambers. The first and second apertures are configured so that that the first apertures have a first total cross-sectional area and the second apertures have a second total cross-sectional area which is smaller than the first total cross-sectional area.

10 Claims, 5 Drawing Sheets

STRUCTURE FOR EXTRACTING COMPRESSED AIR FROM COMPRESSOR OF GAS TURBINE ENGINE AND GAS TURBINE ENGINE WITH THE STRUCTURE

TECHNICAL FIELD

The present invention relates to a structure for extracting a compressed air from a compressor of gas turbine engine. Also, the present invention relates to a gas turbine engine incorporating the structure.

BACKGROUND OF THE INVENTION

In a gas turbine engine with a multi-stage compressor, a compressed air generated by a compressor is in part used for the cooling of a turbine, for example. The compressed air is extracted from the compressor through a plurality of slits formed in a compressor housing at regular intervals in the circumferential direction so as to prevent a pressure drop in the air extracting zone and the resultant uneven pressure distribution in the compressor with respect to the circumferential direction.

For this purpose, JP 2001-304194 (A) discloses to provide various sizes of slits in order to extract various amounts of compressed air depending on usages of the extracted air. This technique may be advantageous in that a suitable pressure distribution is obtained for various amounts of air to be extracted.

On the other hand, the technique requires that the various sizes of slits are formed integrally in the compressor housing, which complicates design modifications of the slits according to the requirement of change in the amount of air. Also, the slits are defined by different members defining inward and outward portions of the compressor housing. This complicates a dimension control of, in particular, narrow slits for extracting smaller amount of air, which needs elevated size precisions. Therefore, an even pressure distribution may not be obtained within the interior of the compressor.

An object of the present invention is to provide a structure for extracting a part of compressed air generated by a compressor, which makes it easy to control a dimension of the narrow slits for extracting smaller amount of air and maintains an even pressure distribution within the interior of the compressor of the gas turbine engine by a simple arrangement defined therein.

SUMMARY OF THE INVENTION

To this end, a structure of a gas turbine engine for extracting a part of compressed air generated by a compressor, comprises a cylindrical housing extending around an axis and forming therein at least a part of a compressing chamber in which air is flowed in a direction parallel to the axis as the air is compressed to generate the compressed air, the cylindrical housing having an annular portion extending around the compressing chamber to define an annular chamber, an annular partition dividing the annular chamber into an annular first plenum chamber and an annular second plenum chamber positioned on an upstream side of the first plenum chamber with respect to the direction and separated from the annular first plenum chamber, the cylindrical housing further having a plurality of first apertures defined therethrough to communicate between the compressing chamber and said annular first plenum chamber;

the annular partition having a plurality of second apertures defined therethrough to communicate between the plurality of first and the plurality of second plenum chambers, the first and second apertures being configured so that the plurality of first apertures have a first total cross-sectional area and the plurality of second apertures have a second total cross-sectional area which is smaller than the first total cross-sectional area;

the annular second plenum chamber being in fluid communication with a second extracting passage for extracting the compressed air from the annular second plenum chamber.

2. The structure of claim 1, wherein the first plenum chamber is in fluid communication with a first extracting passage for extracting the compressed air from the annular first plenum chamber.

According to the arrangement, because the second apertures with the smaller total cross section area are provided on the downstream side of the first apertures with the larger total cross section area, a substantially even pressure is established in the circumferential direction within the compressing chamber. Also, an amount of extraction air can be varied simply by changing the size of the second apertures.

In another aspect of the extraction structure for the gas turbine engine according to the invention, the first plenum chamber is in fluid communication with a first extracting passage for extracting the compressed air from the annular first plenum chamber.

In another aspect of the extraction structure for the gas turbine engine according to the invention, the first extracting passage has a valve provided therein for closing the first extracting passage.

In another aspect of the extraction structure for the gas turbine engine according to the invention, the cylindrical housing has a first housing portion and a second housing portion positioned on an upstream side of the first housing portion, the first and second housing portions having opposed first and second radially extending mating surfaces, respectively, which mate with each other in a sealing engagement when the first and second housing portions are assembled with each other, each aperture of the plurality of first apertures being defined by a recess, the recess comprising either respective recesses in the first and second mating surfaces or a single recess formed in one of the first and second mating surfaces, the first and second mating surfaces having annular first and second recesses defined therein, respectively, to form the annular chamber when the first and second housing portions are assembled with each other.

In another aspect of the extraction structure for the gas turbine engine according to the invention, the second housing portion is made of a plurality of housing segments, each housing segment of the plurality of housing segments having respective annular chamber portions forming a part of the annular chamber when the plurality of housing segments are assembled with each other, each of the respective annular chamber portions having inner and outer peripheral guides forming continuous annular inner and outer guides when the plurality of housing segments are assembled with each other, the annular partition being made of a plurality of partition segments, the plurality of partition segments being assembled to the plurality of housing segments with inner and outer peripheral edges thereof being guided by the inner and outer guides, respectively.

As described above, according to the extraction structure for the gas turbine engine of the invention, even the small amount of extraction air is controlled precisely. Also, an even pressure is established in the circumferential direction within the compressing chamber.

PREFERRED EMBODIMENT OF THE INVENTION

With reference to the accompanying drawings, a preferred embodiment according to the invention will be described below.

Figure 1:
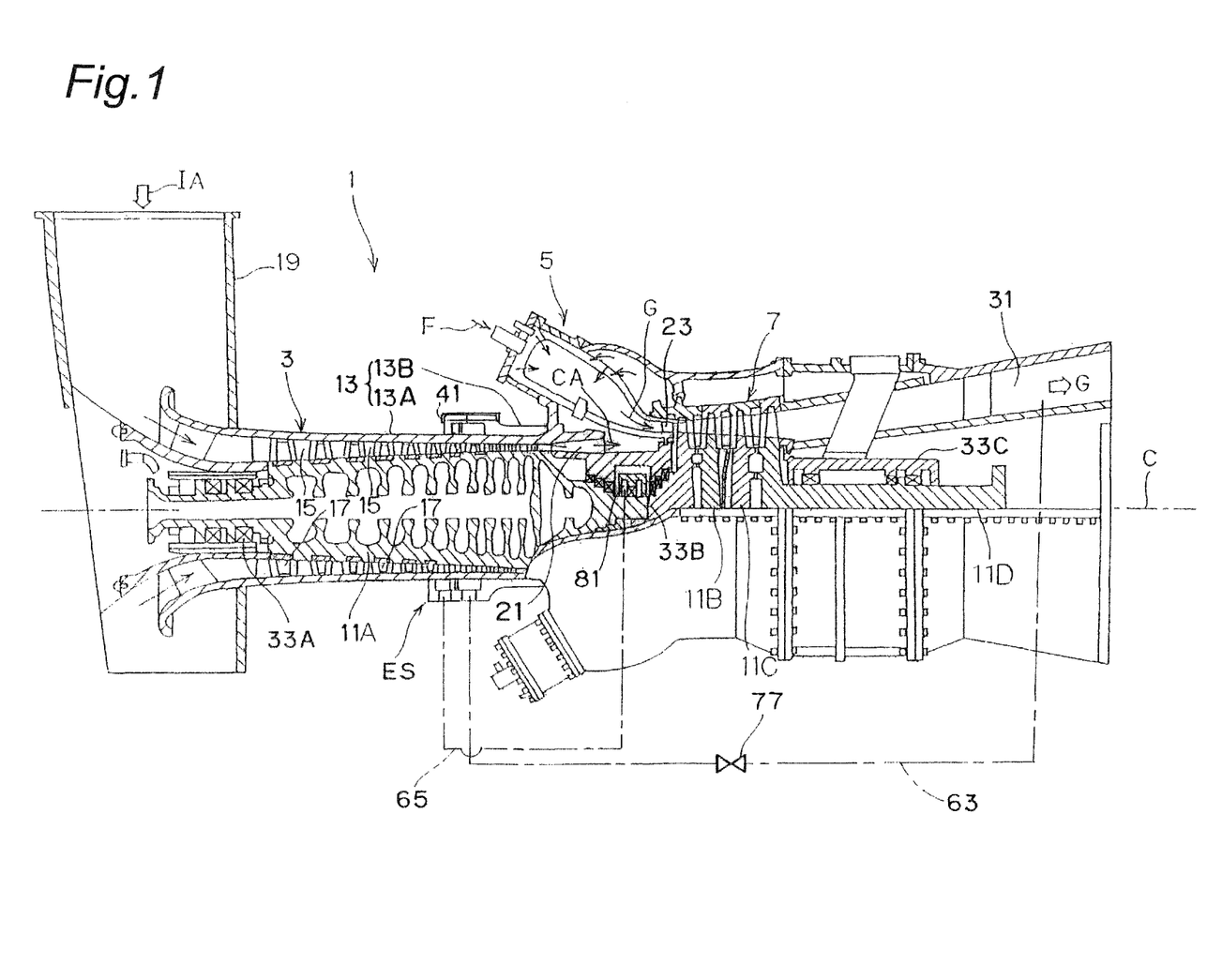
FIG. 1 is a partially broken-away side elevation of a gas turbine engine which incorporates an extraction structure according to an embodiment of the invention.

FIG. 1 shows a partially broken-away side elevation of a gas turbine engine (hereinafter referred to as "engine") which incorporates an extracting structure according to an embodiment of the invention. The engine 1 comprises compressor 3, combustors 5 and turbine 7 so that an intake air IA is compressed by the compressor 3 and then supplied to the combustors 5 where it is combusted with fuel F injected into the combustors 5 to generate a high-temperature and high-pressure combustion gas G which is used for driving the turbine 7. In the following descriptions, left and right sides of the engine 1 with respect to a longitudinal axis C in the drawing will be referred to as "front/upstream" and "rear/downstream", respectively, as necessary.

According to the embodiment, the compressor 3 is an axial-flow compressor and comprises a compressor rotor 11A which constitutes a front rotational portion of the engine. The front portion of the compressor rotor 11A is surrounded by a two-fraction compressor housing 13 to define an annular compression chamber 30 between the compressor rotor 11A and the compressor housing 13. The compressor housing 13 supports a plurality stages of compressor stator blade wheels 15 positioned in the compression chamber 30 and spaced apart from each other in the longitudinal direction. The compressor rotor 11A supports a plurality of stages of compressor rotor blade wheels 17 positioned in the compressor chamber 30 and spaced apart from each other in the longitudinal direction so that each of the rotor blade wheels 17 is positioned on the upstream side of the associated stator blade wheel 15, which allows the stator and rotor blade wheels 15 and 17 to cooperated with each other to compress the intake air IA drawn from the inlet 19. The compressed air CA is then supplied into the combustors 5 through a diffuser 21 provided on the downstream side of the compressor 3.

The combustors 5 are provided at regular intervals in the circumferential direction of the engine 1, where the compressed air CA from the compressor 3 is mixed and combusted with fuel F injected into the interiors of the combustors 5 to generate a high-temperature and high pressure combustion gas G which is then supplied to the turbine 7 through a turbine nozzle 23 or the first stage stator blade wheel of the turbine.

The compressor rotor 11A is connected to a high-pressure turbine rotor 11B of the turbine 7. A low-pressure turbine rotor 11C is located on the downstream side of the high-pressure turbine rotor 11B. The compressor rotor 11A is supported for rotation by the compressor housing 13 through front and middle bearings 33A and 33B. The low-pressure turbine rotor 11C is supported for rotation through the turbine shaft 11D by the rear bearing 33C.

Figure 2:
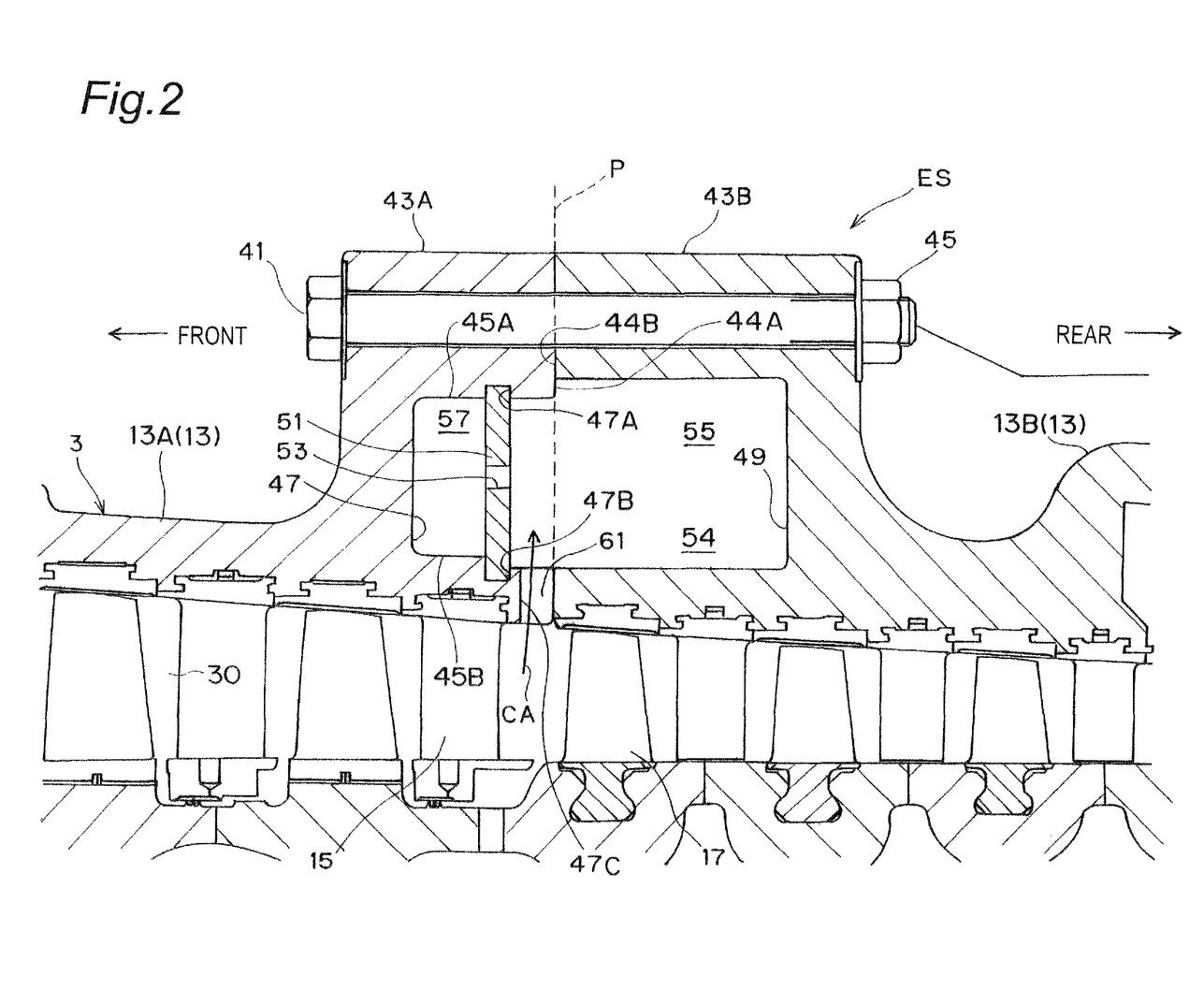
FIG. 2 is a partial longitudinal cross section of the extraction structure in FIG. 1.

The compressor housing 13 is made of a front housing 13A surrounding the front to middle portion of the compressor rotor 11A (e.g., first to seventh stage stator blade wheels) and a rear housing 13B surrounding the middle to rear portion of the compressor 11A (e.g., eighth to last stage stator blades). The front and rear housings 13A and 13B are connected to each other by connection bolts 41. FIG. 2 shows details of the connection between the front and rear housings 13A and 13B. As shown in the drawing, an extraction structure ES for extracting a part of the compressed air CA from the compressor 3 is provided around a mating surface P or contact surface of the front and rear housings 13A and 13B.

The front and rear housings 13A and 13B have outwardly projecting annular flanges 43A and 43B integrally formed at rear and front connection ends thereof, respectively. For example, the front housing 13A has annular front flange 43A at its rear end and the rear housing 13B has annular rear flange 43B having the same outer diameter as the front flange 43A. The front and rear flanges 43A and 43B have through holes extending parallel to the longitudinal axis and provided at regular intervals in the circumferential direction. Inserted through the holes are connection bolts 41 with external threads at distal ends thereof on which nuts 45 are tightened to bring the front and rear housings 13A and 13B into close connection with each other in the longitudinal direction.

As shown in FIG. 2, the front and rear flanges 43A and 43B have rear and front end surfaces 44A and 44B, respectively, extending on a plane P and opposing to each other so that, when the front and rear housings 13A and 13B are assembled with each other, the rear and front surfaces 44A and 44B of the front and rear housings 13A and 13B mate with each other to form a seal therebetween.

The rear end surface 44A of the front flange 43A has an annular front recess 47 or groove defined therein and the front end surface 44B of the rear flange 43B has an annular rear recess 49 or groove defined therein so that, when the front and rear housings 13A and 13B are assembled with each other as shown in the drawing, the front and rear recesses 47 and 49 cooperated with each other to form an annular chamber 54 therebetween.

Figure 3:
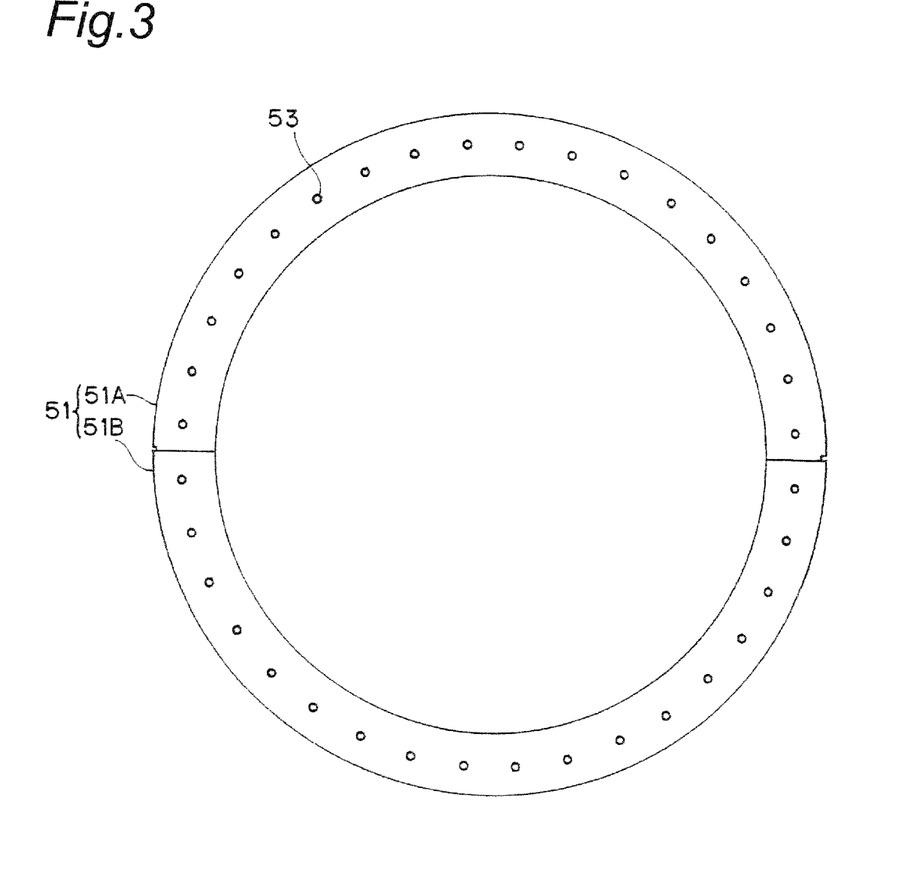
FIG. 3 is a front view of an annular member used in the extraction structure in FIG. 1.
Figure 5:
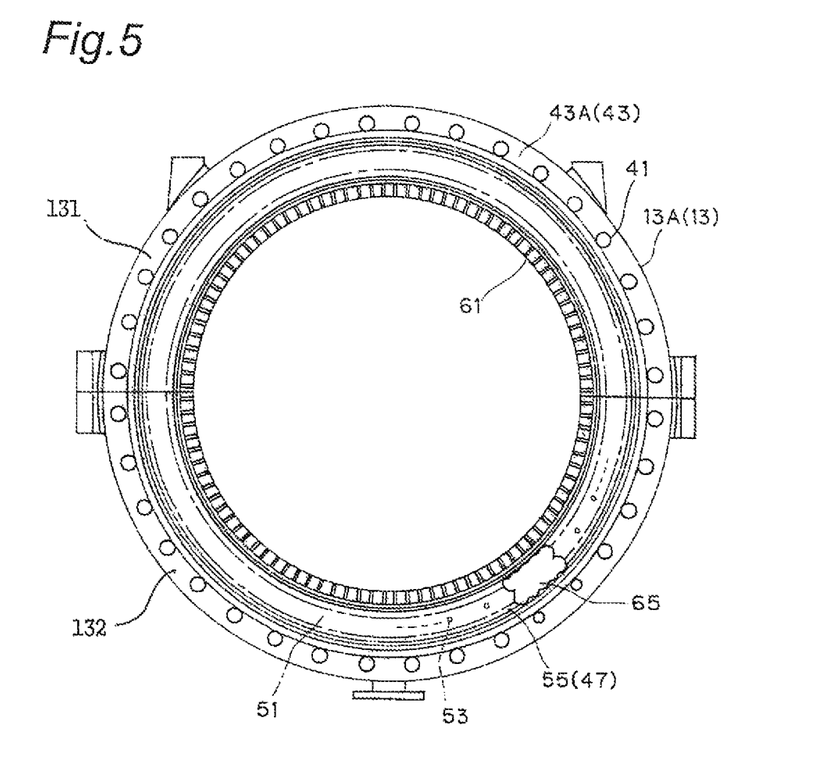
FIG. 5 is a rear view of a front housing in the extraction structure in FIG. 1.

The front recess 47 of the front flange 43A receives an annular partition or plate 51 which is independent of the front flange 43A. As shown in FIG. 3, the plate 51 has a number of second apertures 53 extending therethrough and provided at regular intervals in the circumferential direction. The plate 51 may be made of plural segments having the same size in the circumferential direction. In the embodiment, the plate 51 is made of two halves or semi-annular segments 51A and 51B. This arrangement ensures that the plate 51 is easy to be assembled in the compressor 3. The plate 51 is supported by slidingly engaging its inner and outer circumferential edges in the annular engagement grooves 47A and 47B formed continuously in the opposing surfaces of the outer and inner circumferential walls 45A and 45B, defining radially opposed inner surfaces of the front recess 47. In this embodiment, the front housing 13A is divided into two halves (i.e., housing segments) 131 and 132 (see FIG. 5) and the plate 51 is divided into two halves 51A and 51B (see FIG. 3). Therefore, when assembling, one and the other halves of the plate 51 are slidingly engaged in one and the other halves of the grooves 47A and 47B of the front housing, respectively. Then, the two halves (i.e., housing segments) 131 and 132 of the front housing are assembled with each other to form the front housing 13A.

The housing 13 has a number of through-holes or first apertures 61 communicating between the compressing chamber 30 and the annular chamber 54, in particular, a first plenum chamber 55 described below. In the embodiment, the compressing chamber 30 and the annular chamber 54 are communicated with each other through communication apertures 61 defined by radially extending grooves 47C in a rear end surface 44A of the inner circumferential wall 45B of the front housing 13A. The communication holes may be made of either grooves 47C defined in the rear end surface 44A of the front housing 13A or grooves defined in the front end surface 44B of the rear housing 13B or both, or of through-holes extending through the front or rear housing. The grooves are formed easier than the through-holes. In the embodiment, the communication apertures 61 are provided between the seventh stator blade wheel 15 and the eighth rotor blade wheel 17, allowing a part of the compressed air to be introduced through the communication apertures 61 into the first plenum chamber 55.

Once the front and rear housings 13A and 13B are assembled with each other, the annular chamber 54 positioned around the compressor housing 13 and surrounded by the flanges 43A and 43B is divided into the first plenum chamber 55 positioned on the rear side of the plate 51 and the second plenum chamber 57 positioned on the front side of the plate, the first and second plenum chambers 55 and 57 being communicated with each other through apertures 53 and the first plenum chamber 55 and the compressing chamber 30 being communicated through communication apertures 61.

A total cross section area or total flow passage area of the apertures 53 is designed to be smaller than that of the communication apertures 61. In the embodiment, the number of the apertures 53 is designed to be less than that of the communication apertures 61. Also, in the embodiment, the number of the apertures 53 is designed to be about one half of the communication apertures 61 and the total cross section area of the apertures 53 is designed to be about 10% of the total cross section area of the communication apertures 61.

Figure 4:
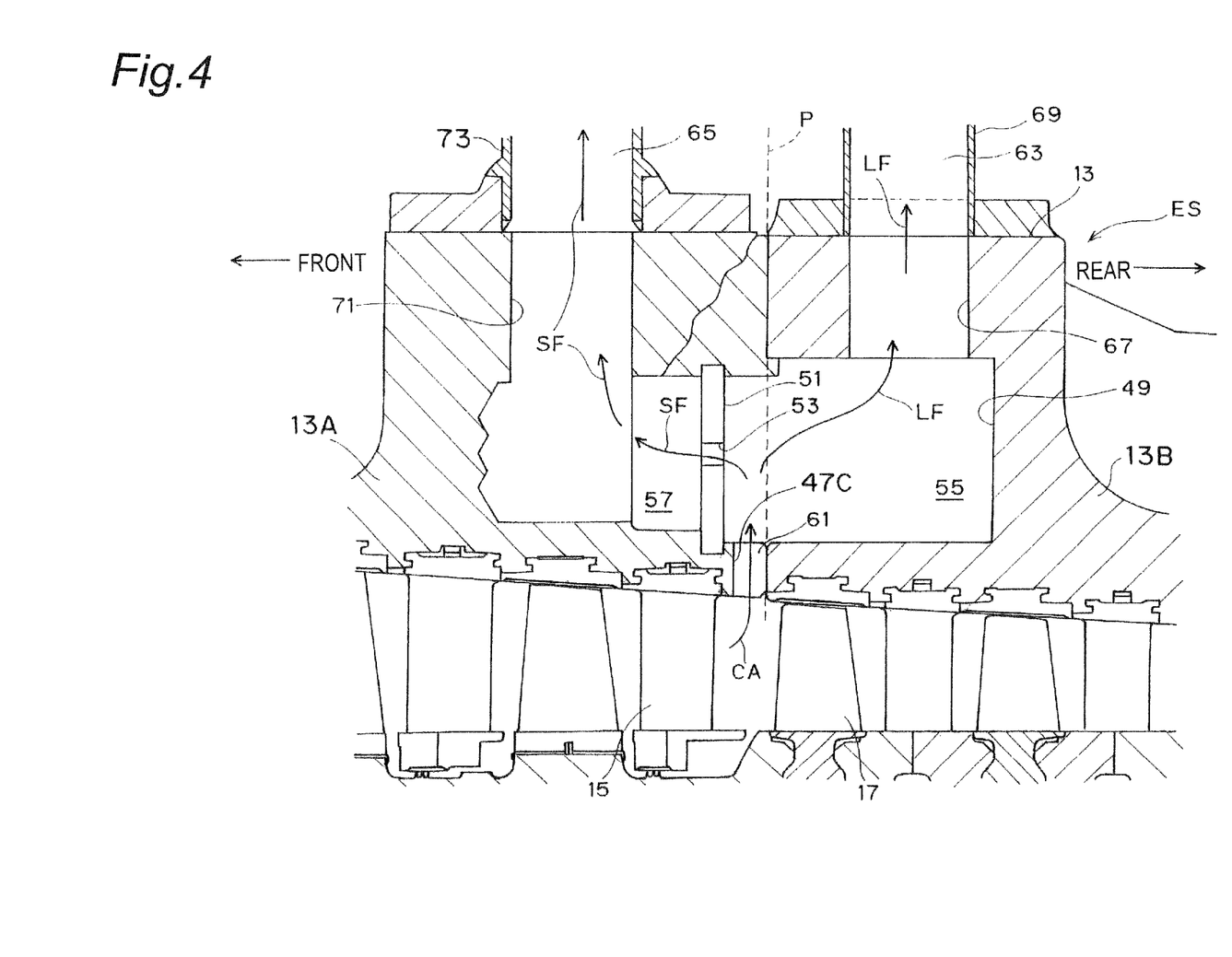
FIG. 4 is a longitudinal cross section of the extraction structure taken on a longitudinal plane angularly different from that in FIG. 2.

FIG. 4 shows a cross section of the extraction structure ES taken along a longitudinal plane which is angularly different from that in FIG. 2. As shown in the drawing, the first plenum chamber 55 is communicated with one or more first extraction passages 63 for extracting the compressed air from the first plenum chamber 55. The second plenum chamber 57 is communicated with one or more second extraction passages 65 for extracting the compressed air from the second plenum chamber 57. The first extraction passages 63 are each made of a first extraction hole 67 defined in the rear housing 13B and a first extraction tube 69 connected to the first extraction hole 67. The second extraction passages 65 are each made of a second extraction hole 71 defined in the front housing 13A and a second extraction tube 73 connected to the second extraction hole 71. Preferably, the first and second extraction holes 67 and 71 are formed on angularly different longitudinal planes.

As described above, because the total cross section area of the communication apertures 61 is set to be larger than that of the apertures 53, the first extraction passages 63 work as a major extraction passage for extracting a larger amount of compressed air through communication apertures 61 and the first plenum chamber 55. The second extraction passages 65, on the other hand, work as a minor extraction passage for extracting a smaller amount of compressed air through the apertures 53 and the second plenum chamber 57. The number of the extraction holes 63 and 65 are determined to obtain the necessary amount of extraction air. In this embodiment, the compressor housing 13 has two first extraction passages 63 provided at a regular interval in the circumferential direction and one extraction passage 65.

In the embodiment shown in FIG. 1, the major first extraction passage 63 is connected to an exhaust gas passage 31. The exhaust gas passage 31 has a valve mechanism 77 so that the first extraction passage 63 can be closed by the valve mechanism 77 except that a large amount of compressed air is needed to be extracted through the first extraction passage 63. The minor second extraction passage 65 is connected to a high-temperature portion of the engine, for example, a bearing chamber 81 which accommodates the middle bearing 33B, so that the compressed air CA is guided to the high-temperature portion for its cooling.

Operations of the extraction mechanism according to the embodiment will be described below. When staring the engine 1 in FIG. 1, a large amount of compressed air CA is preferably extracted to reduce a start-up torque. Then, the valve mechanism on the first extraction passage 63 is opened. This allows that the compressed air CA is guided through the communication apertures 61 (FIG. 5) into the first plenum chamber 55 (FIG. 4). In this instance, because the total cross section area of the first extraction passages 63 is sufficiently larger than that of the communication apertures 61, the communication apertures 61 work as a reducer between the compressing chamber 30 and the first plenum chamber 55 to prevent an uneven pressure distribution in the circumferential direction within an interior of the compressor 3.

Also, an amount of compressed air CA flowing through the communication apertures 61 into the first plenum chamber 55 is sufficiently larger than a maximum amount of air passing through the apertures 53, calculated on the basis of the total cross section area thereof. In addition, the central axes of the apertures 53 are oriented parallel to the longitudinal axis and substantially orthogonal to the central axes of the communication apertures 61 and the first extraction passages 63 oriented in the radial directions. Therefore, a substantial part of the compressed air CA entered through the communication apertures 61 into the first plenum chamber 55 are guided as the major extraction compressed air LF into the first extraction passages 63 and then the exhaust gas passage 31, rather than being guided through the apertures 53 into the second plenum chamber 57.

In the normal operation of the engine 1, the valve mechanism 77 of the first extraction passage 63 is closed so that only a small amount of air is extracted. In this operation, as shown in FIG. 2, the compressed air CA in the compressor 3 is introduced as a small amount of compressed air SF through the communication apertures 61 into the first plenum chamber 55. The communication apertures 61, however, do not work as reducer because the total cross section of the communication apertures 61 is set to be larger than that corresponding to an amount of air being extracted. The total cross section area of the apertures 53 in the plate 51 sufficiently smaller than that corresponding to the amount of air being extracted, which ensures that an even pressure distribution is established in the first plenum chamber 55 and the compressing chamber 30. Also, the plate 51 is formed independently of the compressor housing 15. Therefore, the apertures 53 for controlling small amount of air are formed precisely. Also, the dimension, the number, the positions of the apertures can readily be modified for the specifications.

Although in the previous embodiment the major first extraction passage 63 is connected to the exhaust gas passage 31 in the starting operation of the engine 1 and the minor second extraction passage 65 is connected to the middle bearing chamber 81 for cooling, the extraction passage 63 and 65 may be connected to other internal and/or external portions of the engine 1 where different amounts of compressed air are needed, irrespective of the intended use.

In view of the foregoing, although preferred embodiments of the invention have been described with reference to the accompanying drawings, various additions, eliminations and/ or modifications can be made without departing from the gist of the invention and they are within the scope of the invention. For example, although in the previous embodiment the plate 51 is mounted to the front housing 13A by the sliding engagement in the circumferential grooves 47A and 47B of the front housing 13A, it may be mounted in different ways such as using fixing rings. In this instance, the plate or partition may be fixed by nipping it between the ring and the annular front or rear end surface of the front or rear housing. Also, although the plate 51 is made of plural segments, it may be made of a single annular member. In this instance, the annular member is fixed using the fixing member or ring. Further, although in the previous embodiment the plate 51 is mounted in the front housing 13A, it may be mounted in the rear housing 13B.

PARTS LIST

1: gas turbine engine
3: compressor
13: compressor housing
51: plate (annular member)
53: aperture
55: first plenum chamber
57: second plenum chamber
61: aperture
63: first extraction passage (major extraction passage)
65: second extraction passage (minor extraction passage)
CA: compressed air
ES: extraction structure

The invention claimed is:

1. A structure of a gas turbine engine for extracting a part of compressed air generated by a compressor, comprising:
    a cylindrical housing extending around an axis and forming therein at least a part of a compressing chamber in which air is flowed in a direction parallel to the axis as the air is compressed to generate the compressed air, the cylindrical housing having
        an annular portion extending around the compressing chamber to define an annular chamber,
        an annular partition dividing the annular chamber into an annular first plenum chamber and an annular second plenum chamber positioned on an upstream side of the first plenum chamber with respect to the direction and separated from the annular first plenum chamber,
        the cylindrical housing further having a plurality of first apertures defined therethrough to communicate between the compressing chamber and said annular first plenum chamber;
        the annular partition having a plurality of second apertures defined therethrough to communicate between the annular first and second plenum chambers, the plurality of first apertures and the plurality of second apertures being configured so that the plurality of first apertures have a first total cross-sectional area and the plurality of second apertures have a second total cross-sectional area which is smaller than the first total cross-sectional area;
        the annular second plenum chamber being in fluid communication with a second extracting passage for extracting the compressed air from the annular second plenum chamber.

2. The structure of claim 1, wherein the annular first plenum chamber is in fluid communication with a first extracting passage for extracting the compressed air from the annular first plenum chamber.

3. The structure of claim 2, wherein the first extracting passage has a valve provided therein for closing the first extracting passage.

4. The structure of claim 1, wherein the cylindrical housing has a first housing portion and a second housing portion positioned on an upstream side of the first housing portion, the first and second housing portions having opposed first and second radially extending mating surfaces, respectively, which mate with each other in a sealing engagement when the first and second housing portions are assembled with each other, each aperture of the plurality of first apertures being defined by a recess, the recess comprising either respective recesses in the first and second mating surfaces or a single recess formed in one of the first and second mating surfaces, the first and second mating surfaces having annular first and second recesses defined therein, respectively, to form the annular chamber when the first and second housing portions are assembled with each other.

5. The structure of claim 4, wherein the second housing portion is made of a plurality of housing segments, each housing segment of the plurality of housing segments having respective annular chamber portions forming a part of the annular chamber when the plurality of housing segments are assembled with each other, each of the respective annular chamber portions having inner and outer peripheral guides forming continuous annular inner and outer guides when the plurality of housing segments are assembled with each other, the annular partition being made of a plurality of partition segments, the plurality of partition segments being assembled to the plurality of housing segments with inner and outer peripheral edges thereof being guided by the inner and outer guides, respectively.

6. A gas turbine engine, comprising:
    a compressor for compressing air to generate compressed air;
    a combustor for combusting the compressed air with fuel to generate a high pressure combustion gas; and
    a turbine for rotating a rotor by using the combustion gas;
    the compressor having a cylindrical housing extending around an axis and forming therein at least a part of a compressing chamber in which air is flowed in a direction parallel to the axis as the air is compressed to generate the compressed air, the cylindrical housing having
        an annular portion extending around the compressing chamber to define an annular chamber,
        an annular partition dividing the annular chamber into an annular first plenum chamber and an annular second plenum chamber positioned on an upstream side with respect to the direction and separated from the annular first plenum chamber,
        the cylindrical housing having a plurality of first apertures defined therethrough to communicate between the compressing chamber and the annular first plenum chamber;
        the partition having a plurality of second apertures defined therethrough to communicate between the annular first and second plenum chambers, the plurality of first apertures and the plurality of second apertures being configured so that the plurality of first apertures have a first total cross-sectional area and the plurality of second apertures have a second total cross-sectional area which is smaller than the first total cross-sectional area;

the annular second plenum chamber being in fluid communication with a second extracting passage for extracting the compressed air from the annular second plenum chamber.

7. The gas turbine engine of claim 6, wherein the annular first plenum chamber is in fluid communication with a first extracting passage for extracting the compressed air from the annular first plenum chamber.

8. The gas turbine engine of claim 7, wherein the first extracting passage has an on-off valve provided therein for closing the first extracting passage.

9. The gas turbine engine of claim 6, wherein the cylindrical housing has a first housing portion and a second housing portion positioned on an upstream side of the first housing portion, the first and second housing portions having opposed first and second radially extending mating surfaces, respectively, which mate with each other in a sealing engagement when the first and second housing portions are assembled with each other, each aperture of the plurality of first apertures being defined by a recess, the recess comprising either respective recesses in the first and second mating surfaces or a single recess formed in one of the first and second mating surfaces, the first and second mating surfaces having annular first and second recesses defined therein, respectively, to form the annular chamber when the first and second housing portions are assembled with each other.

10. The gas turbine engine of claim 9, wherein the second housing portion is made of a plurality of housing segments, each housing segment of the plurality of housing segments having respective annular chamber portions forming a part of the annular chamber when the plurality of housing segments are assembled with each other, each of the respective annular chamber portions having inner and outer peripheral guides forming continuous annular inner and outer guides when the plurality of housing segments are assembled with each other, the annular partition being made of a plurality of partition segments, the plurality of partition segments being assembled to the plurality of housing segments with inner and outer peripheral edges thereof being guided by the inner and outer guides, respectively.

* * * * *